Jan. 2, 1934.  W. A. BLACK  1,942,161
CAMERA MOUNT
Filed July 18, 1933    3 Sheets-Sheet 1

INVENTOR
William A. Black
BY Hoquet & Meary
ATTORNEYS

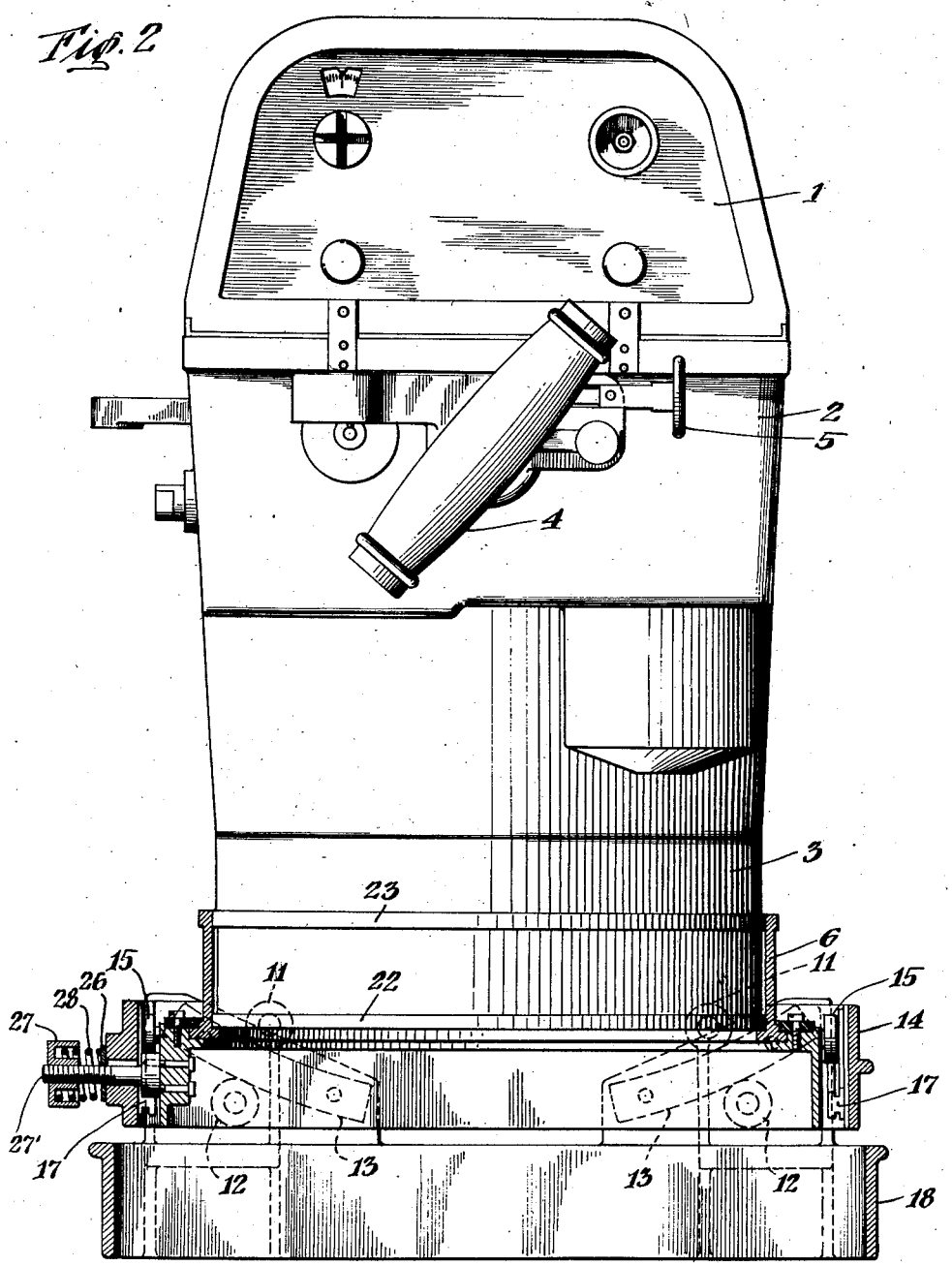

Jan. 2, 1934.　　　W. A. BLACK　　　1,942,161
CAMERA MOUNT
Filed July 18, 1933　　　3 Sheets-Sheet 3
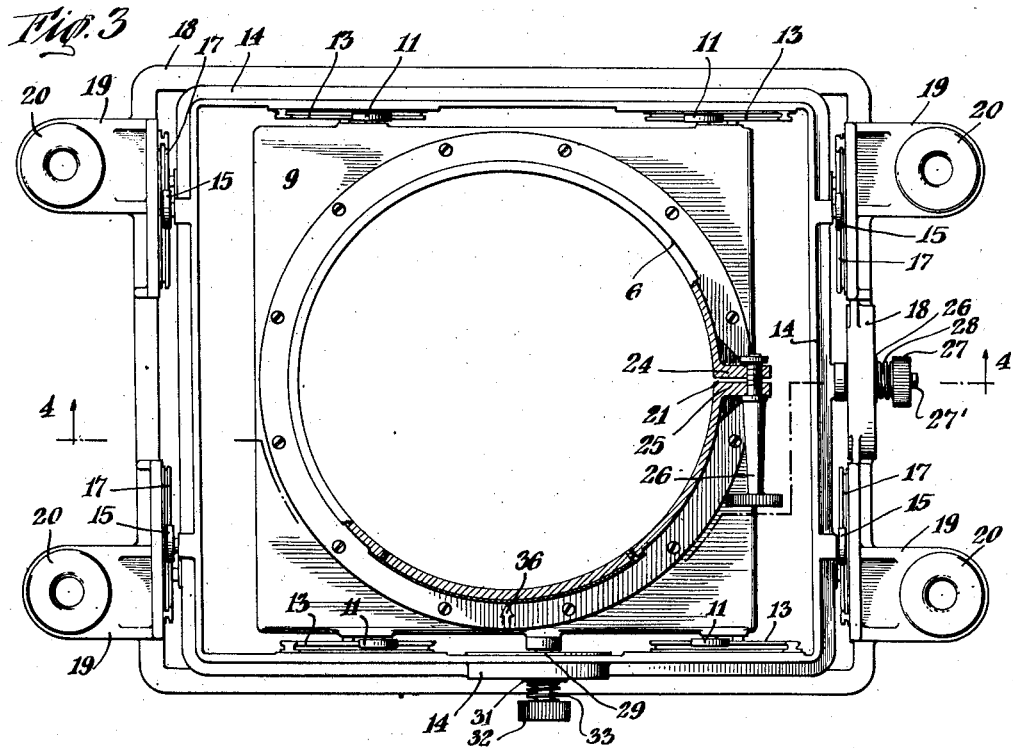
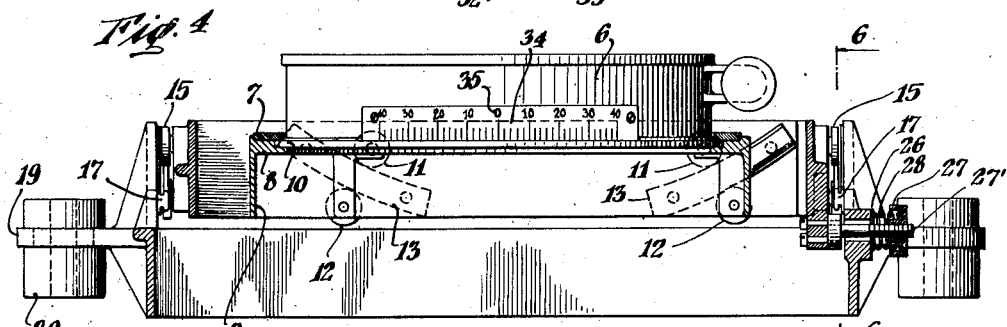
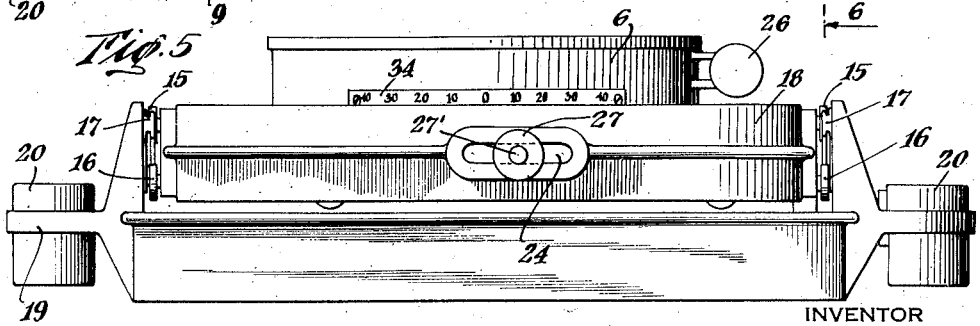
INVENTOR
William A. Black
BY Hoquet & Neary
ATTORNEYS Patented Jan. 2, 1934

1,942,161

UNITED STATES PATENT OFFICE 1,942,161

CAMERA MOUNT

William A. Black, Montclair, N. J., assignor to Fairchild Aerial Camera Corporation, Woodside, Long Island, N. Y., a corporation of New York Application July 18, 1933. Serial No. 680,915

20 Claims. (Cl. 95—12.5)

This invention relates in general to camera mounts and has for one of its objects to provide an improved mount for use particularly in connection with aerial cameras whereby the manipulation thereof can be accomplished with the greatest convenience and for producing the greatest efficiency and accuracy in aerial photography and photographic survey.

It is axiomatic in the art of aerial photographic survey that in providing a mount for the camera, the mount must be such that will allow relative movement of the camera universally, that is at least around two independent lateral pivotal axes and also a rotary movement about the vertical axis. Such mounts are in general use, some adapted for pendulum-like disposition of the camera, and others which employ gimbal frames for disposing the camera non-pendulously.

The result of camera mount design to meet the requirements has, however, been in the form of a complicated structure interfering materially with the manual adjustment therein of the camera in locating the objects to be photographed and by its very nature negativing interchangeability of the camera with respect to the mount. This is especially true with regard to the well-known Fairchild type of aerial camera which comprises three units, namely, a magazine, driving unit and lens cone, a majority of the weight being located considerably nearer the top or magazine than the lens near the bottom of the lens cone. Thus when such a camera is mounted in the conventional gimbal frame so as to be pendulous or through the center of gravity so as to be non-pendulous, the photographer is hampered by the near presence of the mount as he manually swings the camera as the necessity arises, and it is well known that in aerial photographic survey such necessity does arise often and quickly without advance warning. Furthermore, in the past, it has been the practice to employ different types of gripping handles for cameras when used for oblique photography and when used for aerial surveys, because of the fact that the mounts have not been so designed to receive cameras provided with gripping handles of the type considered indispensible for oblique photography.

It is therefore an object of the invention to provide a camera mount which will be in the nature of a universal mount adapted for universal use, that is to say a mount which is not dependent upon the particular design of the camera nor the particular use for which it was intended, and which will eliminate the necessity of removing or replacing parts of the camera when positioning it in the mount.

Another object is to provide a mount which would be adapted to receive the camera and be so clearly out of the way that it will not interfere in any manner with the grip and manual control and adjustment of the camera.

A further object is to provide a mount which will make for easy and ready movement of the camera and be adjustable with respect to the ease of the camera movement relative thereto.

A still further object is to provide a camera mount that will be inherently smooth in operation and be the least susceptible to mal-functioning due to the lodging of foreign particles in its operative moving parts.

With the foregoing and other objects in view, the invention consists in the combination of parts and in the details of construction hereinafter set forth in the following specification and appended claims, certain embodiments thereof being illustrated in the accompanying drawings, in which:

Figure 2 is a view in side elevation of the camera showing the mount partly in vertical section;

Figure 3 is a top plan view of the mount;

Figure 4 is a view in section taken along line 4—4 of Figure 3;

Figure 5 is a view in elevation of the mount taken at right angles to that shown in Figure 1;

Figure 1:
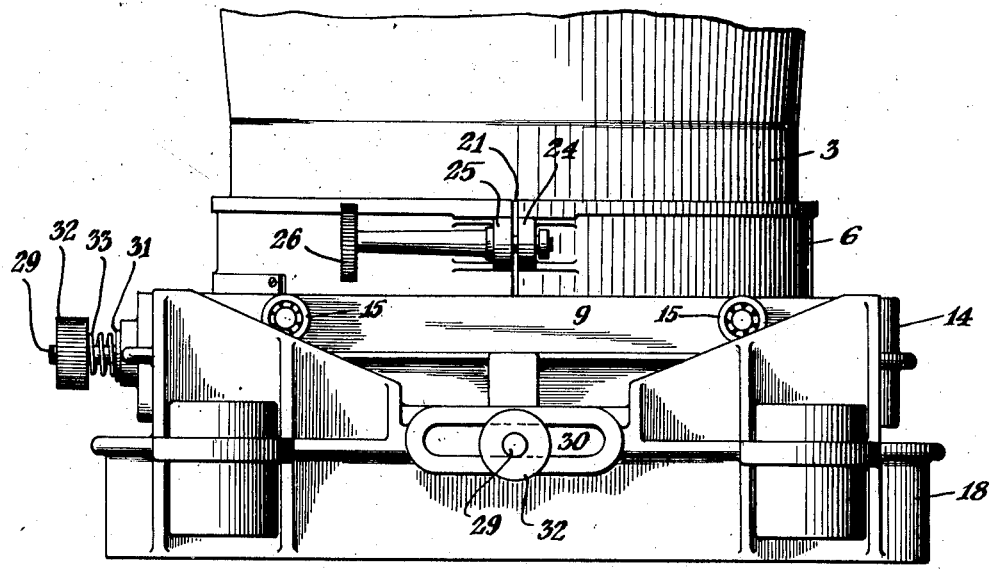
Figure 1 is a view in elevation of the mount showing a fragmentary portion of the camera lens cone.

Referring more particularly to the drawings, the camera illustrated in Figure 1 is of the well-known Fairchild type comprising the magazine unit 1, a main body or a driving unit 2 and a lens cone 3. The camera may be provided with suitable gripping handles much in accordance with the showing in the U. S. Patent to Lutz, et al., No. 1,863,573, dated June 21, 1932 in which one of the gripping handles 38 is arranged on the driving unit adjacent the trigger release and the other, as shown at 79, affixed to the lens cone 1 for aiding in the disposition of the camera and designed particularly for the taking of oblique pictures. Such a gripping handle is shown at 4 adjacent a trigger lever 5 and the other handle may be affixed on the lens cone at a point relatively below the handle 4 and on the opposite side thereof.

Figure 6:
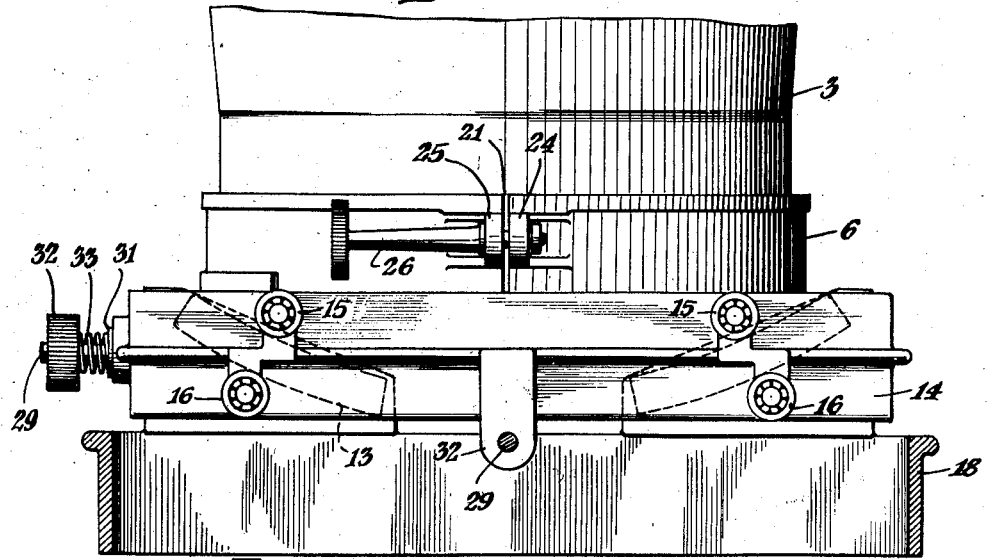
Figure 6 is a view in elevation of a fragmentary portion of the camera, as shown in Figure 1, and also a view of the mount in section taken along line 6—6 of Figure 4.

In carrying out the objects of the invention there is provided in place of the usual gimbal frame, a mount which preferably consists of a rotatable ring 6 mounted for rotation in the bearing formed by the members 7 and 8 carried by a frame 9 so as to receive a flange 10 of the ring 6 therein. This frame 9 has secured thereto a series of pairs of rollers, the upper and lower ones being indicated at 11 and 12 respectively. These rollers are arranged in staggered relation, as shown particularly in Figures 2 and 6, and are adapted to bear downwardly and upwardly, respectively, on a track 13. There are preferably provided four of such arrangements, two spaced on one side and two spaced on the opposite side of the frame. Each of these tracks 13 are arcuate in nature and the two on the same side may be continuous as one but are shown separate in the drawings as the limit of the movement of the camera does not necessitate an arc of such proportions.

A similar arrangement is provided between the frame 14 and another frame 18 concentrically and exteriorly arranged with respect thereto.

These arcuate tracks 13 are carried by an exterior concentric frame 14 so as to allow for relative movement of the ring 6 and its supporting frame 9 with relation to the exterior frame 14 so that as the ring carries the camera, the latter may be moved throughout an arc, the limits of which are described by the engagement of the upper and lower rollers 11 and 12 with the arcuate tracks 13 in a single plane of movement.

In order to provide for another similar movement of the camera in a plane at right angles to the possible movement above described, there is further arranged a series of upper and lower staggered rollers 15 and 16, respectively, secured to the frame 14 and adapted to bear downwardly and upwardly on a series of tracks 17, carried by an exterior concentrically arranged frame 18. This latter frame 18 is provided with brackets 19 for attachment to a suitable portion of the aircraft or other supporting base and the members indicated at 20 are preferably soft rubber shock absorbers for eliminating shock and vibration which might be transferred from the carrying device to the camera.

The ring 6 is divided at 21 and is preferably made of spring metal so as to provide for a normal gap shown at 21. This is for the purpose of receiving the lower portion of the lens cone which is provided with circular flanges 22 and 23 of relatively hard metal to prevent wear. As the camera is placed in the ring 6 it assumes the position shown in Figure 2 and for the purpose of tightening there are provided on the ring 6 a pair of lugs 24 and 25 to receive a turning and tightening bolt 26 to securely hold the camera in place.

As previously stated, this ring 6 is carried by the frame 9 in the bearing provided by the flanges 7 and 8 for holding the ring flange 10 in its proper place. This arrangement is such that the ring is adapted for rotary movement about its central vertical axis so that as the camera is carried therein the latter may be freely rotated.

For the purpose of so arranging the device that the camera may be so suspended that it will be in neutral equilibrium, or in other words, neither non-pendulous nor top heavy, care is taken to so arrange the tracks 13 and the rollers 11 and 12 that the center of gravity of the combined weight of the camera when fully loaded, the circular ring 6, frame 9, and the rollers 11 and 12, will coincide with the center of curvature of the arcs of the tracks 13. By this arrangement the camera when shifted to a position other than vertical will remain in such adjusted position.

Likewise the curvature of the track 17 and the disposition of the rollers 15 and 16 is so calculated and arranged that the center of curvature of the arcs of the tracks 17 on each side of the device is such as will coincide with the center of gravity of the combined weights of the camera when fully loaded, the ring 6, the frame 9 and its rollers 11 and 12, and the frame 14 and its rollers 15 and 16, so that if the frame 14 is moved in a plane at right angles to the movement previously described, the camera when thus adjusted to any other position than the vertical will remain in such adjusted position.

By means of the foregoing description, it will be seen that the mount is so constructed and arranged as to allow for universal movement of the camera, and further, that the mount is disposed so as to be remote from any of the manually operative parts of the camera for the positioning and the operation of the camera as to be clear from any interference with the handling of the camera by the photographer regardless of what types of gripping handles are employed.

It will further be seen that there has been provided a camera mount which is so arranged with respect to the center of gravity of the movable mass that the camera will remain in the manually adjusted position. In this connection and as an added refinement there are provided adjustable spring members for inducing a desired drag in the adjustability of the mount so as to make for smooth operation and prevent over control. Such arrangements are provided in connection with each set of rollers and tracks, as will be seen by reference to Figure 3. In connection with the movement of the rollers 15 and 16 on the tracks 18 for regulating the ease of movement of the frame 14 with respect to the stationary frame 18, there is provided in the frame 18 an aperture 24 through which extends a screw-threaded member 25 extending from the frame 14. The screw shank 27' has arranged thereabout a washer 26 to bear against the frame 18 and a nut 27 with a spring 28 interposed therebetween so that as the turning knob 27 is rotated clockwise an increased drag is interposed affecting the movement of the rollers 15 and 16 on the track 18.

A similar arrangement is provided for the rollers 11 and 12 on the track 18, such an arrangement consisting of a screw shank 29 extending from the frame 9 through an aperture 30 in the frame 14, there being provided a washer 31, a turning knob 32 and a spring 33 therebetween, so that as the turning knob 32 is turned clockwise a drag is induced in the movement of the rollers 11 and 12 on the tracks 13.

Figure 7:
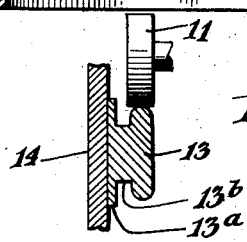
Figure 7 is a detailed view in vertical section through one of the tracks showing a top roller bearing thereon.

An important feature in connection with the invention is the specific arrangement of the track and roller, in that the roller 11, such as shown in Figure 7, is provided with perfectly smooth surface preferably made of hard metallic material. The track 13 has a flange 13a secured to the frame 14 in any approved manner and the inner portion of the track 13 is provided with upper and lower rounded edges in the form of a flange to leave a groove 13b between the inner and outer extremity of the track. It has been found that this particular arrangement of the roller 13 with rounded edges for a spot contact with the rollers 11 and the corresponding recess 13b makes for a substantial elimination of the collection of foreign particles such as sand, grit, and the like, which would interfere with the smooth operation of the various rollers and tracks and prevent jamming of the camera in its various movements.

It has further been found that in actual construction, should precision to the ultimate minute detail not be of the essence in the formation and disposition of the camera mount assembly so that each of the pairs of arcuate tracks have their apex intersected by the extension of the center of gravity of their supported weight, such tracks may be formed by casting a circular track and cutting it into arcs for the eight tracks so as to utilize all of the metal of the cast ring without waste and serve the ordinary purposes of a camera mount which will be substantially self-balanced and non-pendulous.

The positioning of the camera within the ring is brought about by the loosening of the clamping knob 26 and as soon as the spread of the ring is sufficient, the cone of the camera is positioned therein. Prior to tightening the clamp about the camera cone, however, care is taken, when the camera is to be used for aerial mapping purposes, to see that the camera is so disposed with relation to its vertical axis that the front of the camera is arranged forwardly. When this is done, the camera is held and the ring rotated until the arrow 36 carried by the frame 9 coincides with the zero reading shown at 35 on a scale 34 carried by the camera cone. The clamp is then tightened and the normal position of the camera is thus established. As the camera is rotated to any degree, in either direction, about its vertical axis, such rotation from the normal zero position being made necessary by reason of the crabbing of the aircraft, or in other words, a deviation thereof from a straight forward flight, the degree of such necessary rotation to keep the front of the camera forward will be indicated by registry of arrow 36 with the scale, and the degree of crabbing of the aircraft will accordingly be indicated.

I claim:

1. In a camera mount for the reception of the lower portion of said camera as a means of attachment thereto, said mount comprising a unit including stationary and movable members adapting said camera to be angularly adjusted about its own vertical axis with respect to said unit and about a plurality of transverse axes with respect to said stationary members, either simultaneously or as independent adjustments.

2. In a camera mount for the reception of the lower portion of said camera as a means of attachment thereto, said mount comprising means for supporting said camera and adapting the same to be angularly adjusted about its own vertical axis and about a plurality of transverse axes in said mount, either simultaneously or as independent adjustments, said means including relatively movable parts so disposed with relation to the center of gravity of its supported weight including that of the camera that it will be self-balanced and capable of maintaining its adjusted position irrespective of its angular disposition with respect to the vertical.

3. In a camera mount for the receipt of the lower portion of said camera as a means of attachment thereto, said mount comprising means for supporting said camera and adapting the same to be angularly adjusted about its own vertical axis and about a plurality of transverse axes in said mount, either simultaneously or as independent adjustments, said means including a rotatable member adapted to be secured to the camera, and relatively movable parts carried thereby and so disposed with relation to the center of gravity of their supported weight that the assembly will be self-balanced and capable of maintaining its adjusted position irrespective of its angular disposition with respect to the vertical.

4. In a camera mount for the reception of the lower portion of said camera as a means of attachment thereto, said mount comprising means for supporting said camera and adapting the same to be angularly adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc to transverse to said first named prescribed arc.

5. In a camera mount for the reception of the lower portion of said camera as a means of attachment thereto, said mount comprising means for supporting said camera and adapting the same to be angularly adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc to transverse to said first named prescribed arc, each of said arcuate tracks being provided with upper and lower rounded edges for engagement by said rollers, the bearing surfaces of which are substantially flat in contradistinction to the curved edges of the tracks against which they bear.

6. In combination with an aerial camera, a mount therefor including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc.

7. In combination with an aerial camera, a mount therefor including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc, each of said arcuate tracks being provided with upper and lower rounded edges for engagement by said rollers, the bearing surfaces of which are substantially flat in contradistinction to the curved edges of the tracks against which they bear.

8. In combination with an aerial camera including a magazine, a body and a lens cone, a mount for receiving in releasable locked relation the lower extremity of said lens cone, said amount comprising means for supporting said camera and adapting the same to be adjusted about its own vertical axis and about a plurality of transverse axes in said mount, either simultaneously or as independent adjustments.

9. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including relatively movable parts so disposed with relation to the center of gravity of its supported weight including that of the camera that it will be self-balanced and capable of mainaining its adjusted position irrespective of its angular disposition with respect to the vertical.

10. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including a rotatable member adapted to be secured to the camera, and relatively movable parts carried thereby and so disposed with relation to the center of gravity of their supported weight that the assembly will be self-balanced and capable of maintaining its adjusted position irrespective of its angular disposition with respect to the vertical.

11. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc.

12. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc, each of said arcuate tracks being provided with upper and lower rounded edges for engagement by said rollers, the bearing surfaces of which are substantially flat in contradistinction to the curved edges of the tracks against which they bear.

13. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc, each of said arcuate tracks being provided with upper and lower rounded edges for engagement by said rollers, the bearing surfaces of which are substantially flat in contradistinction to the curved edges of the tracks against which they bear, positively adjustable means for introducing a predeterminable spring actuated drag in the movement of the relatively movable frames through the medium of said rollers and tracks.

14. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc, positively adjustable means for introducing a predeterminable spring actuated drag in the movement of the relatively movable frames through the medium of said rollers and tracks and also a lock of said frames.

15. In a camera mount for the reception of the lower portion of said camera as a means of attachment thereto, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc transverse to said first named prescribed arc, positively adjustable means for introducing a predeterminable spring actuated drag and lock in the movement of the relatively movable frames through the medium of said rollers and tracks.

16. In a camera mount for the reception of the lower portion of said camera as a means of attachment thereto, said mount comprising means for supporting said camera and adapting the same to be adjusted about its own vertical axis and about a plurality of transverse axes in said mount, either simultaneously or as independent adjustments, said means including a rotatable member adapted to be secured to the camera, a frame carrying said member, a second frame provided with arcuate tracks adapted to receive rollers on said first frame to bear on the upper and lower surfaces of said tracks to provide for movement in the prescribed arc, a third and stationary frame carrying arcuate tracks to receive upper and lower rollers on said second frame to bear on the upper and lower surfaces of said tracks to provide for movement in an arc to transverse to said first named prescribed arc, each of said arcuate tracks being provided with upper and lower rounded edges for engagement by said rollers, the bearing surfaces of which are substantially flat in contradistinction to the curved edges of the tracks against which they bear, positively adjustable means for introducing a predeterminable spring actuated drag and lock in the movement of the relatively movable frames through the medium of said rollers and tracks.

17. In a camera mount for the reception of the lower portion of said camera as a means of attachment thereto, said mount comprising means for supporting said camera and adapting the same to be adjusted about its own vertical axis and about a plurality of transverse axes in said mount, either simultaneously or as independent adjustments, positively adjustable means for introducing a predeterminable spring actuated drag and lock in the means for permitting movement of the camera about transverse axes.

18. In a camera mount for the reception of the lower portion of said camera as a means of attachment thereto, said mount comprising means for supporting said camera and adapting the same to be adjusted about its own vertical axis and about a plurality of transverse axes in said mount, either simultaneously or as independent adjustments, said means including relatively movable parts so disposed with relation to the center of gravity of its supported weight including that of the camera that it will be self-balanced and capable of maintaining its adjusted position irrespective of its angular disposition with respect to the vertical, positively adjustable means for introducing a predeterminable spring actuated drag and lock in the means for permitting movement of the camera about transverse axes.

19. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, positively adjustable means for introducing a predeterminable spring actuated drag and lock in the means for permitting movement of the camera about transverse axes.

20. In combination with an aerial camera including a magazine, a body and a lens cone, a mount for receiving in releasable locked relation the lower extremity of said lens cone, said mount comprising means for supporting said camera and adapting the same to be adjusted about its own vertical axis and about a plurality of transverse axes in said mount, either simultaneously or as independent adjustments, said means including relatively movable parts so disposed with relation to the center of gravity of its supported weight including that of the camera that it will be self-balanced and capable of maintaining its adjusted positon irrespective of its angular disposition with respect to the vertical, positively adjustable means for introducing a predeterminable spring actuated drag and lock in the means for permitting movement of the camera about transverse axes.

WILLIAM A. BLACK.